(12) United States Patent
Kiyokami et al.

(10) Patent No.: US 11,506,274 B2
(45) Date of Patent: Nov. 22, 2022

(54) POWER TRANSMITTING SYSTEM OF VEHICLE

(71) Applicant: TOYOTA JIDOSHA KABUSHIKI KAISHA, Toyota (JP)

(72) Inventors: Hiroaki Kiyokami, Toyota (JP); Tetsuo Hori, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 489 days.

(21) Appl. No.: 16/519,183

(22) Filed: Jul. 23, 2019

(65) Prior Publication Data

US 2020/0032895 A1 Jan. 30, 2020

(30) Foreign Application Priority Data

Jul. 25, 2018 (JP) .............................. JP2018-139827
Feb. 1, 2019 (JP) .............................. JP2019-017490

(51) Int. Cl.
*F16H 57/04* (2010.01)
*F16H 57/027* (2012.01)
*F16H 61/00* (2006.01)

(52) U.S. Cl.
CPC ....... *F16H 57/0423* (2013.01); *F16H 57/027* (2013.01); *F16H 57/0435* (2013.01); *F16H 61/0025* (2013.01); *F16H 2200/0021* (2013.01)

(58) Field of Classification Search
CPC .............. F16H 57/0423; F16H 57/027; F16H 57/0435; F16H 61/0025; F16H 57/0426; F16H 57/0456; F16H 2200/0021
See application file for complete search history.

(56) References Cited

U.S. PATENT DOCUMENTS

| 2011/0297258 | A1 | 12/2011 | Tanaka et al. |
| 2015/0128738 | A1 | 5/2015 | Ono et al. |
| 2016/0025205 | A1* | 1/2016 | Smith ................. F16H 57/0436 184/6.12 |
| 2018/0106357 | A1 | 4/2018 | Kawakami et al. |
| 2019/0323642 | A1* | 10/2019 | Kiyokami ............... F16L 47/02 |
| 2020/0132184 | A1* | 4/2020 | Umeki ................... B60K 6/445 |

FOREIGN PATENT DOCUMENTS

| JP | 2011-256908 A | 12/2011 |
| JP | 2014-240669 A | 12/2014 |
| JP | 2015-094389 A | 5/2015 |
| JP | 2017-136964 A | 8/2017 |
| JP | 2018-063037 A | 4/2018 |

* cited by examiner

*Primary Examiner* — Tisha D Lewis
(74) *Attorney, Agent, or Firm* — Oliff PLC

(57) ABSTRACT

A vehicular power transmitting system including a power transmitting member, an oil pump, and an oil piping assembly, and the oil piping assembly includes an oil piping body having an oil inlet and fixed, and a branch pipe. The branch pipe has a width direction parallel to a longitudinal direction of the oil piping body, and includes proximal and distal end portions. The proximal end portion is connected to the oil piping body, and the distal end portion has a delivery nozzle from which the oil is delivered toward the lubricated portion. The branch pipe has an opening formed in the proximal end portion, for communication of the branch pipe with the oil piping body, the opening having a dimension in a width direction of the branch pipe, which dimension is larger than a dimension of the distal end portion in the width direction of the branch pipe.

12 Claims, 6 Drawing Sheets

POWER TRANSMITTING SYSTEM OF VEHICLE

This application claims priority from Japanese Patent Applications Nos. 2018-139827 filed on Jul. 25, 2018 and 2019-017490 filed on Feb. 1, 2019, the disclosures of which are herein incorporated by reference in its entirety.

FIELD OF THE INVENTION

The present invention relates in general to a power transmitting system of a vehicle, and more particularly to an oil piping assembly provided in the power transmitting system.

BACKGROUND OF THE INVENTION

There is known a power transmitting system of a vehicle having a drive power source and drive wheels. The power transmitting system comprises a power transmitting member through which a vehicle drive force is transmitted from the drive power source to the drive wheels, an oil pump which is operated with a rotary motion of the power transmitting member, and an oil piping assembly through which an oil is delivered from the oil pump to lubricated portions of the power transmitting system. JP-2015-094389A discloses a technique for delivering an oil to lubricated portions of a power transmitting system of a vehicle. The vehicular power transmitting system disclosed in JP-2015-094389A is provided with an oil piping assembly through which the oil is directed to the lubricated portions, so that the oil is adequately delivered to the lubricated portions, to permit reduction of wearing of parts in the lubricated portions and improvement of durability of those parts, for instance. JP-2017-136964A discloses an oil pump mechanically connected to and operated by a power transmitting member.

SUMMARY OF THE INVENTION

By the way, the oil piping assembly provided in the vehicular power transmitting system has an elongate branch pipe which branches from an oil piping body of the oil piping assembly, to efficiently direct the oil to the lubricated portions. The branch pipe is connected at its proximal end portion to the oil piping body, and has a delivery nozzle formed at its distal end portion, to deliver the oil toward the lubricated portions. However, an operating speed of the oil pump operated with the rotary motion of the power transmitting member is reduced with a decrease of a rotating speed of the power transmitting member. The reduction of the operating speed of the oil pump causes reduction of a pressure of the oil generated by the oil pump, giving rise of a possibility of insufficiency of an amount of the oil supplied into the oil piping assembly. Namely, when the vehicle is running at a relatively low speed, the amount of the oil to be supplied into the oil piping assembly is relatively small, so that the oil piping assembly is not sufficiently filled with the oil, that is, a rate of flow of the oil through the oil piping assembly is relatively low, whereby an amount of the oil flowing to the distal end portion of the branch pipe is reduced, causing a risk of failure to deliver a sufficiently large amount of oil to the lubricated portions, in particular, a risk of insufficient amount of the oil to be supplied to the lubricated portions through the branch pipe located at an upper end of the oil piping assembly, which is relatively distant from the oil pump.

As a solution to solve the problem described above, it is considered to increase an inner diameter of the branch pipe (a cross sectional surface area of flow of the oil through the branch pipe), for increasing the amount of the oil flowing to the distal end portion of the branch pipe. This solution results in an increase of a mass of the branch pipe, which causes an increase of a moment of the branch pipe upon application of an external vibration load to the branch pipe, giving rise to a risk of deterioration of durability of the branch pipe. That is, it has been difficult to increase the amount of the oil flowing to the distal end portion of the branch pipe, while permitting reduction of the risk of deterioration of durability of the branch pipe.

The present invention was made in view of the background art described above. It is therefore an object of the present invention to provide a power transmitting system of a vehicle, which is provided with an oil piping assembly and which ensures a sufficient amount of flow of an oil to a distal end portion of a branch pipe of the oil piping assembly, while permitting reduction of a risk of deterioration of durability of the branch pipe.

The object indicated above is achieved according to the following modes of the present invention:

According to a first mode of the invention, there is provided a power transmitting system of a vehicle including a drive power source and drive wheels, the power transmitting system comprising: a power transmitting member through which a vehicle drive force is transmitted from the drive power source to the drive wheels; an oil pump which is operated with a rotary motion of the power transmitting member; and an oil piping assembly through which an oil is delivered from the oil pump to a lubricated portion of the power transmitting system located on an upper side of the vehicle than the oil pump. The oil piping assembly includes an oil piping body which has an oil inlet through which the oil is introduced therein and which is fixed so as to extend from the oil inlet upwards of the vehicle. The oil piping assembly further includes a branch pipe which branches laterally from an upper end portion of the oil piping body and which is held in communication with the oil piping body. The branch pipe includes a proximal end portion and a distal end portion. The proximal end portion is connected to the oil piping body such that a direction of width of the proximal end portion is parallel to the oil piping body, and the distal end portion has a delivery nozzle from which the oil is delivered toward the lubricated portion. The branch pipe has an opening formed in the proximal end portion, for communication of the branch pipe with the oil piping body. The opening has a dimension in a direction of width of the branch pipe, which dimension is larger than a dimension of the distal end portion in the direction of width of the branch pipe.

According to a second mode of the invention, the power transmitting system according to the first mode of the invention is configured such that the opening of the branch pipe has a cross sectional surface area of flow of the oil therethrough, which is larger than a cross sectional surface area of flow of the oil through the oil piping body.

According to a third mode of the invention, the power transmitting system according to the first or second mode of the invention is configured such that the branch pipe has opposite two side walls having respective opposite two inner wall surfaces which define a branch oil flow passage formed through the branch pipe in the width direction, for communication between the oil piping body and the delivery nozzle, and one of the side walls which has an upstream one of the two inner wall surfaces that is located on an upstream side of a main oil flow passage through which the oil flows through the oil piping body is connected to the oil piping body such that the upstream inner wall surface is inclined on a downstream side with respect to a direction perpendicular to the main oil flow passage at the distal end thereof.

According to a fourth mode of the invention, the power transmitting system according to the third mode of the invention is configured such that the other of the opposite two side walls which has a downstream one of the two inner wall surfaces that is located on a downstream side of the main oil flow passage is connected to the oil piping body such that the downstream inner wall surface is inclined at an angle smaller than the angle of inclination of the upstream inner wall surface, with respect to the direction perpendicular to the main oil flow passage.

According to a fifth mode of the invention, the power transmitting system according to any one of the first through fourth modes of the invention is configured such that the oil piping assembly further includes a second branch pipe which branches laterally from a longitudinal part of the oil piping body from which the above-indicated branch pipe branches as a first branch pipe. The second branch pipe extends in a direction opposite to a direction of extension of the first branch pipe from the oil piping body, and has a second delivery nozzle formed in a distal end portion of the second branch pipe. The second delivery nozzle of the second branch pipe has a smaller distance from the oil piping body, than the delivery nozzle of the first branch pipe provided as a first delivery nozzle. The first and second branch pipes have respective first and second branch oil flow passages which are formed therethrough, for communication between the oil piping body and the respective first and second delivery nozzles, and which have respective first and second upstream-side branching points with respect to the main oil flow passage. The first upstream-side branching point is located upstream of the second upstream-side branching point.

According to a sixth mode of the invention, the power transmitting system according to any one of the first through fifth modes of the invention is configured such that the oil piping assembly further includes a third branch pipe which branches laterally from the oil piping body such that the third branch pipe is located below the above-indicated branch pipe provided as a first branch pipe. The third branch pipe has a third delivery nozzle formed in a distal end portion of the third branch pipe. The oil piping body has an air breather hole for air communication between an interior space in the oil piping body and an outside atmosphere. The air breather hole is located above a part of the oil piping body from which the first branch pipe branches.

According to a seventh mode of the invention, the power transmitting system according to any one of the first through sixth modes of the invention is configured such that the branch pipe has a branch oil flow passage formed therethrough, for communication between the oil piping body and the delivery nozzle, and the branch oil flow passage includes a tapered section having a width dimension which continuously decreases in a direction of extension of the branch pipe from the proximal end portion toward the distal end portion, as seen in a two-dimensional plane defined by an axis parallel to the direction of width of the branch pipe and an axis parallel to the direction of extension of the branch pipe.

In the vehicular power transmitting system according to the first mode of the invention, the oil piping assembly includes the oil piping body which has the oil inlet through which the oil is introduced therein and which is fixed so as to extend from the oil inlet upwards of the vehicle. The oil piping assembly further includes the branch pipe which branches laterally from the upper end portion of the oil piping body and which is held in communication with the oil piping body. The branch pipe includes the proximal end portion and the distal end portion. The proximal end portion is connected to the oil piping body such that the direction of width of the proximal end portion is parallel to the oil piping body, and the distal end portion has the delivery nozzle from which the oil is delivered toward the lubricated portion. The branch pipe has the opening formed in the proximal end portion, for communication of the branch pipe with the oil piping body. The opening has the dimension in the direction of width of the branch pipe, which dimension is larger than the dimension of the distal end portion in the direction of width of the branch pipe. In the present vehicular power transmitting system wherein the width dimension of the opening of the proximal end portion of the branch pipe is larger than the width dimension of the distal end portion, an amount of the oil flowing toward the distal end portion of the branch pipe is made larger even at a relatively low running speed of the vehicle, for example, than where the width dimension of the opening of the proximal end portion is equal to or smaller than the width dimension of the distal end portion. At the low running speed of the vehicle, the amount of the oil to be supplied from the oil pump into the oil piping assembly is relatively small, so that the oil piping assembly is not sufficiently filled with the oil, that is, a rate of flow of the oil through the oil piping assembly is relatively low. The branch pipe is further configured such that the width dimension of the opening at the proximal end portion, which is determined to permit a flow of a sufficient amount of the oil to the distal end portion, is larger than the width dimension of the distal end portion, in other words, the width dimension of the distal end portion is smaller than that of the proximal end portion. Accordingly, the rigidity of the branch pipe is made higher than where the width dimension of the distal end portion is equal to that of the proximal end portion, for instance, so that a risk of deformation of the branch pipe due to a moment upon application of an external vibration load to the branch pipe is reduced. Thus, the width dimension of the opening at the proximal end portion of the branch pipe, which is larger than the width dimension of the distal end portion, makes it possible to ensure a sufficient amount of flow of the oil to the distal end portion of the branch pipe, while permitting reduction of a risk of deterioration of durability of the branch pipe.

In the vehicular power transmitting system according to the second mode of the invention, the opening provided for communication of the branch pipe with the oil piping body has the cross sectional surface area of flow of the oil therethrough, which is larger than the cross sectional surface area of flow of the oil through the oil piping body, so that the oil flowing through the oil piping body can be smoothly introduced into the branch pipe, wherein the amount of flow of the oil toward the distal end portion of the branch pipe can be effectively increased even when the oil piping assembly is not filled with the oil, that is, a rate of flow of the oil through the oil piping assembly is relatively low.

In the vehicular power transmitting system according to the third mode of the invention, one of the two side walls which has the upstream inner wall surface located on the upstream side of the main oil flow passage is connected to the oil piping body such that the upstream inner wall surface is inclined on the downstream side with respect to the direction perpendicular to the main oil flow passage. Accordingly, the oil flowing through the oil piping body is smoothly introduced into the branch pipe, so that an amount of flow of the oil toward the distal end portion of the branch pipe can be effectively increased even when the oil piping assembly is not filled with the oil, that is, a rate of flow of the oil through the oil piping assembly is relatively low.

In the vehicular power transmitting system according to the fourth mode of the invention, the other of the opposite two side walls which has the downstream inner wall surface located on the downstream side of the main oil flow passage is connected to the oil piping body such that the downstream inner wall surface is inclined at the angle smaller than the angle of inclination of the upstream inner wall surface, with respect to the direction perpendicular to the main oil flow passage, namely, such that the downstream inner wall surface is almost perpendicular to the main oil flow passage. Accordingly, the oil introduced into the branch oil flow passage is prevented from flowing back into the oil piping body along the downstream inner wall surface, so that the amount of flow of the oil toward the distal end portion of the branch pipe can be further increased.

In the vehicular power transmitting system according to the fifth mode of the invention, the oil piping assembly further includes the second branch pipe which branches laterally from the longitudinal part of the oil piping body from which the first branch pipe branches in a direction opposite to a direction in which the first branch pipe branches. The second delivery nozzle of the second branch pipe has the smaller distance from the oil piping body, than the first delivery nozzle of the first branch pipe. The first upstream-side branching point of the first branch oil flow passage formed through the first branch pipe is located upstream of the second upstream-side branching point of the second branch oil flow passage formed through the second branch pipe. Namely, the first branch pipe having a comparatively large distance between the oil piping body and its first delivery nozzle than the second branch pipe having a comparatively small distance between the oil piping body and its second delivery nozzle branches from the oil piping body at the first branching point located upstream of the second branching point of the second branch pipe, so that the oil is preferentially introduced into the first branch pipe which has the comparatively large distance from the oil piping body to its first delivery nozzle and accordingly has a higher resistance to the flow of the oil through its first branch oil flow passage. Accordingly, irrespective of the different oil flow resistances due to the different distances from the oil piping body to the first and second delivery nozzles of the first and second branch pipes, delivery pressures of the oil delivered from the first and second delivery nozzles are made substantially equal to each other and thus amounts of delivered oil at respective delivery nozzles are equalized even when the oil piping assembly is not filled with the oil, that is, a rate of flow of the oil through the oil piping assembly is relatively low.

In the vehicular power transmitting system according to the sixth mode of the invention, the oil piping assembly further includes the third branch pipe which branches laterally from the oil piping body such that the third branch pipe is located below the above-indicated branch pipe provided as the first branch pipe. The oil piping body has the air breather hole located above the first branch pipe. Accordingly, air is exhausted from the oil piping body into the outside atmosphere through the air breather hole, so that the oil can be adequately introduced into the first and third branch pipes located below the air breather hole. In the absence of the air breather hole, only a part of the air within the oil piping body may be exhausted into the outside atmosphere through the first and third branch pipes, but the rest of the air stays in an uppermost portion of the oil piping body, and disturbs flows of the oil into the first branch pipe, causing a difference of an amount of flow of the oil into the first branch pipe with respect to that of the oil into the third branch pipe.

In the vehicular power transmitting system according to the seventh mode of the invention, the branch oil flow passage formed through the branch pipe includes the tapered section the width dimension of which continuously decreases in the direction of extension of the branch pipe from the proximal end portion toward the distal end portion, as seen in the two-dimensional plane defined by the axis parallel to the direction of width of the branch pipe and the axis parallel to the direction of extension of the branch pipe. Accordingly, the oil introduced from the oil piping body into the branch pipe smoothly flows through the tapered section toward the distal end portion, so that the amount of delivery of the oil from the distal end portion of the branch pipe to the lubricated portion can be effectively increased.

DETAILED DESCRIPTION OF PREFERRED EMBODIMENTS

Figure 1:
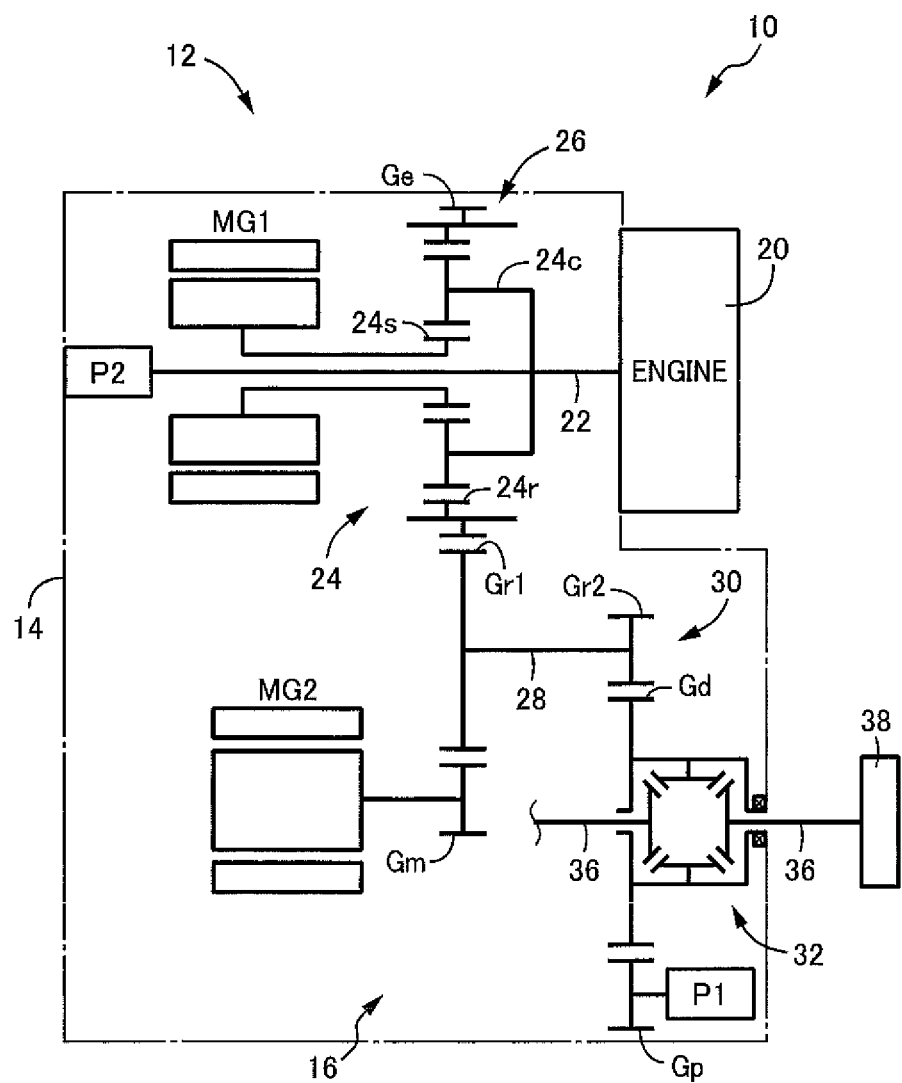
FIG. 1 is a schematic view showing an arrangement of a power transmitting system of a vehicle, which is constructed according to one embodiment of this invention.

The power transmitting system according to the present invention is suitably applicable to various types of vehicle such as an engine-drive vehicle, a hybrid vehicle having at least one electric motor in addition to an engine as a drive power source, and an electric vehicle having only at least one electric motor as a drive power source. For example, the power transmitting system may be a transaxle of a transversely mounted type of an FF (front-engine front-drive) vehicle wherein a plurality of axes are disposed in the direction of width of the vehicle, or a power transmitting system of a FR (front-engine rear-drive) vehicle or a four-wheel-drive vehicle.

For instance, the oil pump is connected to an output portion of the power transmitting member rotated with the drive wheels of the vehicle, and is mechanically operated with a rotary motion of the power transmitting member. However, the oil pump may be connected to and mechanically operated by a drive power source other than the output portion of the power transmitting member. In an electric vehicle wherein an electric motor provided as a drive power source is mechanically connected to the drive wheels through a differential gear device or any other gear mechanism, an entirety of the power transmitting member is considered as the output portion rotated with the drive wheels.

A lubricating device provided with the above-described mechanical oil pump and the oil piping assembly may be provided with only this mechanical oil pump, but may be provided with another or second mechanical oil pump, or an electrically operated oil pump as well as the mechanical oil pump. The lubricated portions of the power transmitting system are portions which are operated with generation of friction or heat and which should be lubricated or cooled. For example, the lubricated portions include bearings rotatably supporting rotary shafts of a power transmitting mechanism, as well as mutually meshing gears and a transmission belt through which a vehicle drive force is transmitted. The lubricating device may be used to deliver the oil to a heat-generating portion other than the power transmitting mechanism, such as electric motor or motors and/or electric generator or generators provided in a hybrid vehicle or an electric vehicle. While the oil may be delivered through the oil piping assembly to the lubricated portions, a heat exchanger such as an oil cooler may be provided between the oil pump and the lubricated portions.

While a resin piping assembly including a plurality of divisional components is preferably used as the oil piping assembly, a metallic piping assembly may be used. The above-described branch pipe (hereinafter referred to as the "first branch pipe") and the second and third branch pipes are formed integrally with, or separately from the oil piping body. The oil piping body may be optionally provided with at least one of the second and third branch pipes in addition to the first branch pipe. Namely, the oil piping body may be provided with none of the second and third branch pipes. While each of the first, second and third branch pipes is formed so as to branch from the oil piping body at its proximal end portion such that each branch pipe extends substantially horizontally, the respective branch pipe may be inclined so as to extend in a direction inclined upwards or downwards from the horizontal direction, or may extend upwards or downwards from the oil piping body. Thus, the branch pipes may branch from the oil piping body in various manners depending upon structural configuration or shape of the oil piping body. Each of the first, second and third branch pipes has a delivery nozzle formed to deliver the oil in the downward direction, or in the horizontal or any other direction. The delivery nozzles of the first, second and third branch pipes may have the same cross sectional surface area of flow of the oil (same diameter), or respective different cross sectional surface areas depending upon their distances from the oil piping body or their height positions.

Preferably, the cross sectional surface area of flow of the oil through the opening of the first branch pipe provided for its communication with the oil piping body is larger than the cross sectional surface area of flow of the oil through a portion of the oil piping body from which the branch pipe branches. However, the cross sectional surface area of flow of the oil through the opening may be substantially the same as or smaller than the cross sectional surface area of flow of the oil through the above-indicated portion of the oil piping body. The first branch pipe has a first branch oil flow passage in communication with a main oil flow passage formed through the oil piping body. For example, the first branch pipe is connected at its proximal end portion to the oil piping body such that an upstream one of two inner wall surfaces defining the first branch oil flow passage, with regard to the direction of flow of the oil through the main oil flow passage, is inclined at its proximal end portion on a downstream side of the main oil flow passage, while the other downstream inner wall surface is inclined at the proximal end portion with respect to a direction perpendicular to the main oil flow passage, at an angle smaller than that of the upstream inner wall surface. However, the downstream inner wall surface may be inclined at the proximal end portion on an upstream side of the main oil flow passage, while the upstream inner wall surface is inclined at the proximal end portion at an angle smaller than that of the upstream inner wall surface with respect to the direction perpendicular to the main oil flow passage. Further, the upstream and downstream inner wall surfaces may be inclined in the same direction or in the respective opposite directions, with respect to the direction perpendicular to the main oil flow passage.

The second branch pipe having the delivery nozzle which has a smaller distance from the oil piping body than the delivery nozzle of the first branch pipe has a structure similar to that of the first branch pipe, with a smaller width dimension at its proximal end portion, for instance. However, the second branch pipe may have various configurations. For example, the second branch pipe may have a constant shape in cross section over its entire length from a proximal end portion to a distal end portion. The foregoing description regarding the second branch pipe applies to the third branch pipe. The second branch pipe is preferably formed such that the second branch oil flow passage has an upstream-side branching point located downstream of an upstream-side branching point of the first branch oil flow passage of the first branch pipe, with regard to the direction of flow of the oil through the main oil flow passage. However, the upstream-side branching points of the first and second branch oil flow passages may be located at substantially the same positions, or the upstream-side branching point of the second branch oil flow passage may be located upstream of the upstream-side branching point of the first branch oil flow passage. The first and second branch pipes are formed such that their openings communicating with the oil piping body overlap each other at least partially in the direction of flow of the oil through the main oil flow passage of the oil piping body.

At a position above a portion of the oil piping body from which the first branch pipe branches, there is preferably formed the air breather hole for air communication between the interior space in the oil piping body and the outside atmosphere. However, the air breather hole need not be formed where the delivery nozzle of the first branch pipe is configured to permit discharging of air out of the oil piping assembly. Alternatively, an air breather hole may be formed through an upper wall of the first branch pipe. The first branch oil flow passage formed through the first branch pipe has the tapered section the width dimension of which continuously or gradually decreases in the direction from its proximal end portion toward its distal end portion, in the two-dimensional plane defined by two axes respectively parallel to the width direction and the direction of extension of the first branch pipe. Two walls defining the tapered section may be formed so as to extend along respective straight lines, or respective curved lines. Further, the width dimension of the tapered section may decrease in steps. The first branch pipe may have various outer configurations, as well as various inner configurations of its first branch oil flow passage.

EMBODIMENTS

Preferred embodiments of the present invention will be described in detail by reference to the drawings. It is to be understood that the drawings are simplified and transformed as needed, and do not necessarily accurately represent dimensions and shapes of various elements of the embodiment.

Reference is first made to FIG. 1, which is the schematic view showing an arrangement of a vehicle 10 including a power transmitting system 12 in the form of a transaxle constructed according to one embodiment of this invention. The power transmitting system 12 includes a power transmitting mechanism 16 of a gear type having a plurality of axes which are shown in a common plane of the view of FIG. 1. The power transmitting system 12 is configured to transmit an output of a drive power source in the form of an engine 20 to left and right drive wheels 38, and is of a transversely mounted type installed on the vehicle 10 of an FF type, for example, such that the plurality of axes of the gear type power transmitting mechanism 16 are parallel to a width or transverse direction of the vehicle 10. The power transmitting mechanism 16 is accommodated within a casing 14. The engine 20 is an internal combustion engine such as a gasoline or diesel engine, which generates a vehicle drive force by combustion of a fuel. The casing 14 consists of a plurality of members as needed.

The power transmitting mechanism 16 is provided with an input shaft 22 connected to the engine 20 functioning as the drive power source, and a planetary gear set 24 of a single-pinion type and a first motor/generator MG1, which are disposed coaxially with the input shaft 22. The planetary gear set 24 and the first motor/generator MG1 function as an electrically controlled differential portion 26. The planetary gear set 24 functions as a differential mechanism, and includes a carrier 24c connected to the input shaft 22, a sun gear 24s connected to the first motor/generator MG1, and a ring gear 24r provided with an engine output gear Ge. The carrier 24c, sun gear 24s and ring gear 24r respectively correspond to first, second and third rotary elements, while the first motor/generator MG1 corresponds to a differential control motor. The first motor/generator MG1 is operated selectively as an electric motor or an electric generator. When the first motor/generator MG1 is operated as the electric generator, a rotating speed of the sun gear 24s is continuously controlled by a regenerative control of the first motor/generator MG1, so that an operating speed of the engine 20 is continuously varied, and a rotary motion of the engine 20 is output from the engine output gear Ge. When the sun gear 24s is placed in a freely rotatable state with torque of the first motor/generator MG1 being zeroed, the engine 20 and the power transmitting mechanism 16 are disconnected from each other, so that dragging of the engine 20 by the power transmitting mechanism 16 is prevented.

The power transmitting system 12 includes a speed reducing gear device 30 having a shaft 28, a large-diameter speed reducing gear Gr1 and a small-diameter speed reducing gear Gr2. These speed reducing gears Gr1 and Gr2 are mounted on opposite axial ends of the shaft 28. The large-diameter speed reducing gear Gr1 is held in meshing engagement with the engine output gear Ge, and a motor output gear Gm of a second motor/generator MG2. The second motor/generator MG2 is operated selectively as an electric motor or an electric generator. The second motor/generator MG2 serves as a drive power source for driving the vehicle 10 when the second motor/generator MG2 is operated as the electric motor. Thus, the second motor/generator MG2 is operable as a vehicle driving electric motor.

Figure 2:
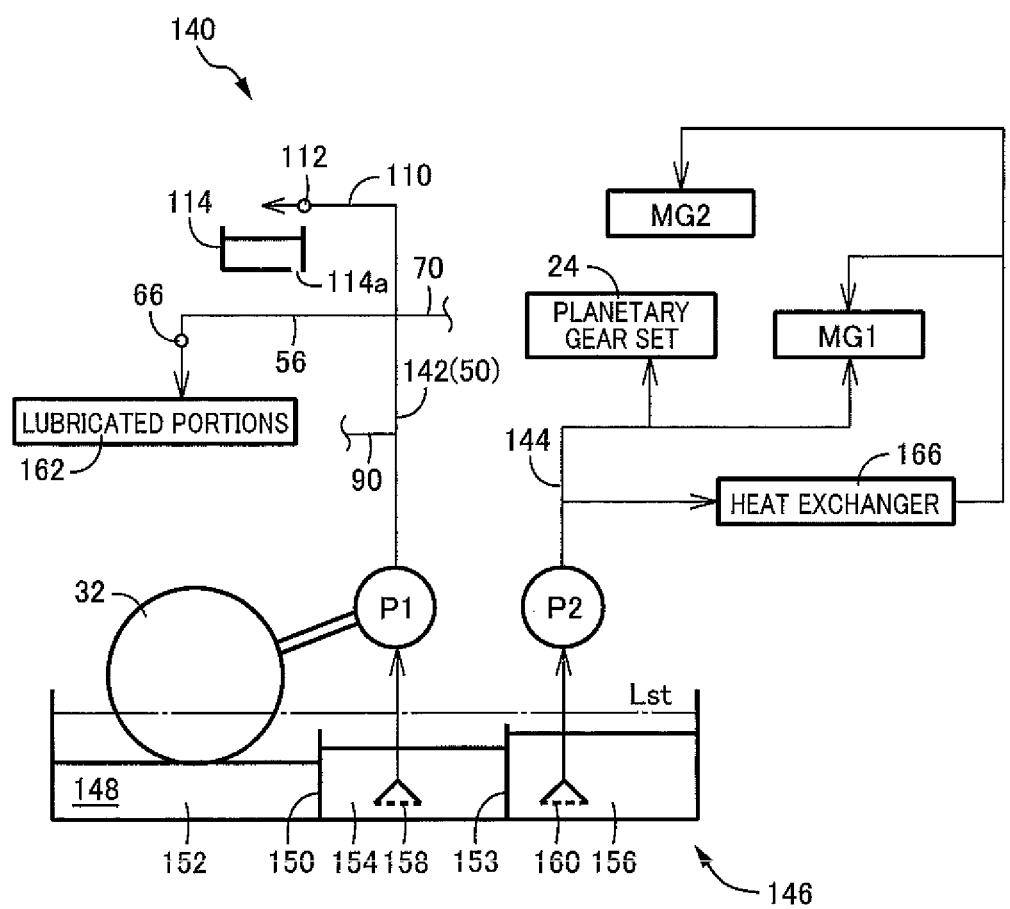
FIG. 2 is a hydraulic circuit diagram illustrating a lubricating device provided in the power transmitting system shown in FIG. 1.

The small-diameter speed reducing gear Gr2 is held in meshing engagement with a differential ring gear Gd of a differential gear device 32, so that drive forces of the engine 20 and the second motor/generator MG2 are distributed to left and right drive shafts 36 through the differential gear device 32, and transmitted to the left and right drive wheels 38. The engine output gear Ge, the large-diameter speed reducing gear Gr1, the small-diameter speed reducing gear Gr2 and the differential ring gear Gd primarily constitute a gear mechanism. At least a lower portion of the differential gear device 32 is immersed in a bath of an oil (lubricant oil) 148 stored in an oil reservoir 146 (shown in FIG. 2) provided in a bottom portion of the casing 14, so that the oil 148 is splashed up with a rotation motion of the differential gear device 32.

The vehicle 10 constructed as described above is placed in a selected one of an EV (electric vehicle) drive mode and an HV (hybrid vehicle) drive mode, according to a drive mode switching map and on the basis of a required vehicle drive force (as represented by an operation amount of an accelerator pedal) and a running speed V of the vehicle 10, for example. In the EV drive mode, the vehicle 10 is driven with the second motor/generator MG2 operated as the drive power source, while the engine 20 is held at rest. This EV drive mode is selected when the required vehicle drive force is comparatively small, namely, the vehicle 10 is in a low-load running state. In the EV drive mode, a fuel supply to the engine 20 is stopped, and the torque of the first motor/generator MG1 is zeroed, so that the sun gear 24s of the planetary gear set 24 is freely rotatable, and the first motor/generator MG1 is held substantially at rest, even in a running state of the vehicle 10. In the HV drive mode, the vehicle 10 is driven with the engine 20 operated as the drive power source, while a regenerative operation of the first motor/generator MG1 is controlled. The HV drive mode is selected when the required vehicle drive force is larger than in the EV drive mode, namely, the vehicle 10 is in a high-load running state. In this HV drive mode, the second motor/generator MG2 is operated as the drive power source when generation of an assisting torque is required to accelerate the vehicle 10, for example, or is kept operated as the drive power source.

The vehicle 10 may be placed in an engine drive mode in place of the above-described HV drive mode, or as well as in the HV drive mode. In the engine drive mode, only the engine 20 is operated as the drive power source. Although the arrangement of the power transmitting system 12 of the vehicle 10 has been described for illustrative purpose only, the power transmitting system 12 may be constructed with various changes or modifications. For example, the planetary gear set 24 of the single-pinion type may be replaced by a planetary gear set of a double-pinion type. Further, the second motor/generator MG2 may be disposed coaxially with the first motor/generator MG1, and the electrically controlled differential portion 26 may be replaced by a mechanically operated transmission.

In the present embodiment of the invention, the power transmitting system 12 of the vehicle 10 is provided with a lubricating device 140 (shown in FIG. 2) including the oil reservoir 146. The lubricating device 140 further includes a first oil pump P1 and a second oil pump P2 as an oil pumping device. The first and second oil pumps P1 and P2 are connected to respective first and second oil supply passages 142 and 144 which are independent of each other, and which are assigned to respective groups of predetermined lubricated portions of the power transmitting mechanism 16. As shown in FIG. 1, the first oil pump P1 is a mechanical oil pump mechanically operated by a pump driving gear Gp held in meshing engagement with the differential ring gear Gd, while the second oil pump P2 is a mechanical oil pump mechanically operated by the engine 20 through the input shaft 22. The first oil pump P1 may be modified such that the pump driving gear Gp is held in meshing engagement with the large-diameter speed reducing gear Gr1 or the small-diameter speed reducing gear Gr2, which is rotated in synchronization with the differential ring gear Gd. The second oil pump P2 is an oil pump operated by a drive power source different from a vehicle drive force output portion, that is, an oil pump operated by the engine 20. However, the second oil pump P2 may be replaced by an electrically operated oil pump operated by an exclusive pump driving electric motor. The differential ring gear Gd functions as a power transmitting member through which the vehicle drive force is transmitted from the engine 20 to the drive wheels 38, and corresponds to an output portion of the power transmitting system 12 which is rotated with the drive wheels 38, while the first oil pump P1 functions an oil pump which mechanically operated with a rotary motion of the power transmitting member in the form of the differential ring gear Gd.

The first and second oil pumps P1 and P2 described above are configured to suck the oil 148 from the oil reservoir 146 located in the bottom portion of the casing 14, and to deliver the oil 148 through the first and second oil supply passages 142 and 144. In the present embodiment, the oil reservoir 146 is formed as the bottom portion of the casing 14. However, the oil reservoir 146 may be replaced by a separate oil pan attached to the bottom portion of the casing 14. A space formed within the oil reservoir 146 is divided by a first partition wall 150 into a rear portion as seen in a longitudinal direction of the vehicle 10, and the other portion. This rear portion of the space serves as a first oil reservoir portion 152 located below the differential gear device 32. The above-indicated other portion of the space is divided by a second partition wall 153 into two parts located adjacent to each other in the longitudinal direction of the vehicle 10, namely, a second oil reservoir portion 154 located adjacent to the first oil reservoir portion 152, and a third oil reservoir portion 156 located adjacent to the second oil reservoir portion 154. A suction port 158 of the first oil pump P1 is disposed within the second oil reservoir portion 154, while a suction port 160 of the second oil pump P2 is disposed within the third oil reservoir portion 156. These two suction ports 158 and 160 are connected to the respective first and second oil pumps P1 and P2 through respective suction passages.

The first and second partition walls 150 and 153 function as an oil-flow restricting portion which allows but restricts flows of the oil 148 between the first and second oil reservoir portions 152 and 154, and between the second and third oil reservoir portions 154 and 156, such that baths of the oil 148 in the first, second and third oil reservoir portions 152, 154 and 156 have different levels, when the first and second oil pumps P1 and P2 are operated. Namely, when the first and second oil pumps P1 and P2 are both held at rest while the vehicle 10 is stationary, the baths of the oil 148 in all of the three oil reservoir portions 152, 154 and 156 have the same level, that is, a static level Lst indicated by a one-dot chain line in FIG. 2, which level Lst is higher than upper ends of the first and second partition walls 150 and 153, since the oil 148 delivered to the various lubricated portions of the power transmitting system 12 drops down into the oil reservoir 146 while the oil pumps P1 and P2 are held at rest. When the oil pumps P1 and P2 are operated during running of the vehicle 10, however, the oil 148 is delivered from the oil pumps P1 and P2 to the lubricated portions of the power transmitting system 12, so that a volume of the oil 148 staying in the oil reservoir 146 is reduced, whereby the levels of the baths of the oil 148 in the oil reservoir portions 152, 154 and 156 are lowered below the upper ends of the partition walls 150 and 153, and to respective different heights indicated by solid lines in FIG. 2, due to the flow restricting function of the partition walls 150 and 153. It is noted that the first and second partition walls 150 and 153 may have the same height dimension, and may be dispensed with.

The first oil pump P1 is operatively connected to and operated by the output portion of the power transmitting system 12 in the form of the differential ring gear Gd, and the first oil supply passage 142 connected to a delivery port of the first oil pump P1 is provided to deliver the oil 148 to the various lubricated portions of the power transmitting mechanism 16. The lubricated portions include bearings and the gears Ge, Gr1, Gr2, Gd, Gm and Gp incorporated in the power transmitting mechanism 16. The lubricated portions may further include the differential gear device 32. Since the first oil pump P1 is operatively connected to and operated by the differential ring gear Gd of the differential gear device 32, and is therefore operated even in the EV drive mode in which the engine 20 is held at rest, the first oil pump P1 is able to suck the oil 148 by an amount according to the vehicle running speed V, and to deliver the oil 148 to the lubricated portions. That is, the vehicle running speed V corresponds to an operating speed of the first oil pump P1, and to a volume of the oil 148 delivered from the first oil pump P1.

The second oil supply passage 144 is connected to a delivery port of the second oil pump P2, to deliver the oil 148 to the predetermined lubricated portions located above the second and third oil reservoir portions 154 and 156. These lubricated portions include: the input shaft 22; the planetary gear set 24; and the first motor/generator MG1. The second oil supply passage 142 is provided with a heat exchanger 166 to cool the oil 148, so that the cooled oil 148 is delivered to the first motor/generator MG1 and the second motor/generator MG2, for cooling and preventing overheating of the motor/generator MG1 and the motor/generator MG2. For example, the heat exchanger 166 is an oil cooler of an air cooling or water cooling type for cooling the oil 148. Since the engine 20 used to operate the second oil pump P2 can be operated even while the vehicle 10 is stationary, an adequate amount of the oil 148 can be sucked by and delivered to the lubricated portions from the second oil pump P2, irrespective of a variation of the vehicle running speed V, even while the vehicle 10 is stationary. It is noted that the second oil pump P2 may be dispensed with, provided the first oil pump P1 is adapted to deliver the oil 148 to both of the first and second oil supply passages 142 and 144, which are held in communication with each other.

Figure 3:
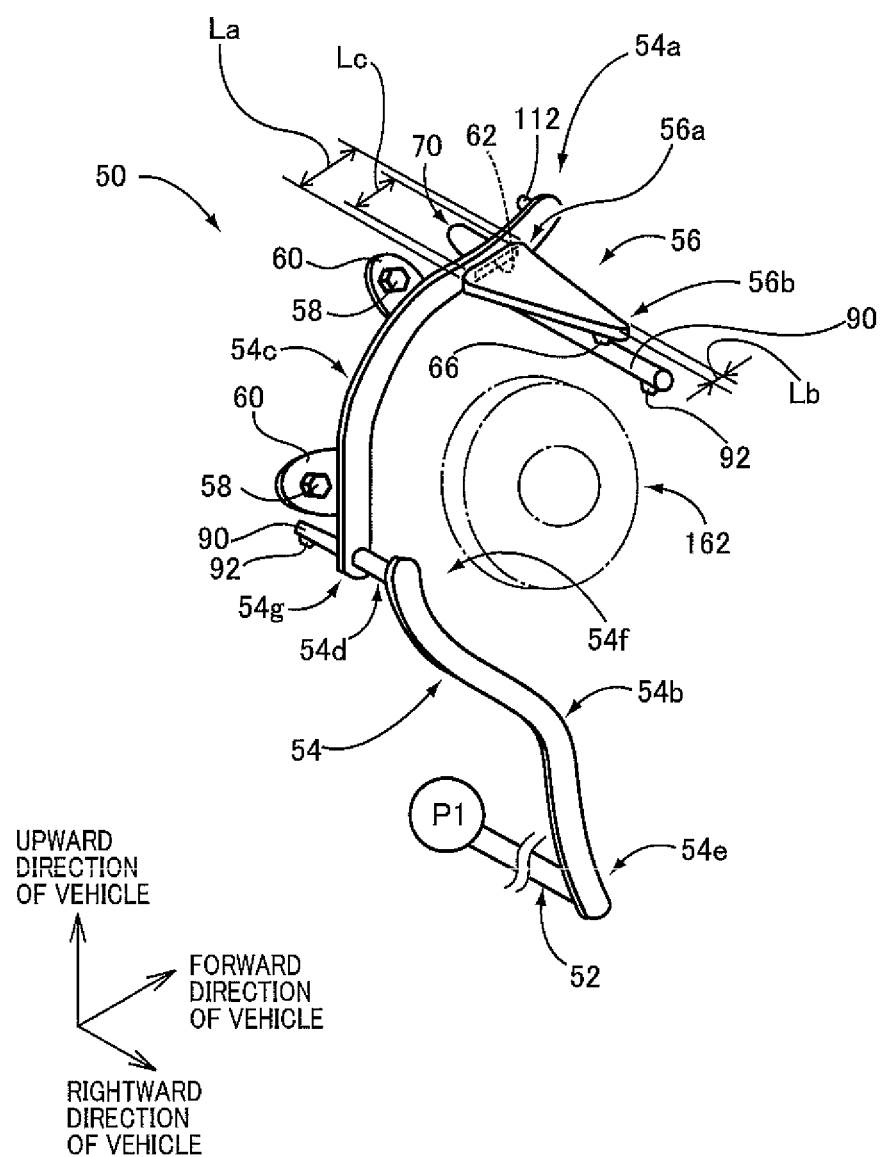
FIG. 3 is an enlarged schematic perspective view showing major structural elements of an oil piping assembly serving as a first oil supply passage of the lubricating device of FIG. 2, and portions of the power transmitting system located near the oil piping assembly.

FIG. 3 is the schematic perspective view showing in enlargement major portions of an oil piping assembly 50 which has the first oil supply passage 142 and which includes an uppermost branch pipe 56. The oil piping assembly 50 is configured to receive the oil 148 sucked up with an operation of the first oil pump P1 from the oil reservoir 146 formed within the casing 14, and to direct the oil 148 to a selected one or ones of a plurality of lubricated portions 162 of the power transmitting system 12. The oil piping assembly 50 is formed separately from the casing 14, and accommodated within the casing 14. The lubricated portions 162 are located above of the first oil pump P1.

As shown in FIG. 3, the oil piping assembly 50 has a generally elongate structure extending in an upward direction of the vehicle 10, that is, extending vertically when the oil piping assembly 50 is installed in position in the power transmitting system 12 while the vehicle 10 is held in a level posture. For example, the oil piping assembly 50 is a hollow or tubular structure which is formed of a resin material and has a circular, elliptical or polygonal shape in cross section, for instance. The oil piping assembly 50 includes an oil piping body 54 extending upwards from its oil inlet 52 communicating with the first oil pump P1 to receive the oil 148, and the branch pipe 56 extending laterally in an elongate fashion from an upper end part 54a of the oil piping body 54.

The oil piping body 54 includes a first piping body portion 54b and a second piping body portion 54c which extend upwards, and a third piping body portion 54d which connects an upper end 54f of the first piping body portion 54b and a lower end 54g of the second piping body portion 54c to each other.

The first piping body portion 54b consists of two elongate sheets formed of a resin material by injection molding. The two elongate sheets have respective U-shaped grooves and are bonded together by high-frequency induction welding, for instance, such that the U-shaped grooves cooperate to define an oil passage. The first piping body portion 54b is an elongate generally planar member which has a width dimension larger than its thickness dimension, and a higher degree of rigidity in its width direction than in its thickness direction. As shown in FIG. 3, the first piping body portion 54b is curved so as to extend in a rearward direction of the vehicle 10 while extending in the upward direction of the vehicle 10. The first piping body portion 54b has the above-indicated oil inlet 52 formed at its lower end part 54e in communication with the first oil pump P1.

Like the first piping body portion 54b, the second piping body portion 54c consists of two elongate sheets 54cx and 54cy formed of a resin material by injection molding. These two elongate sheets 54cx and 54cy have respective U-shaped grooves and are bonded together by high-frequency induction welding, for instance, such that the U-shaped grooves cooperate to define an oil passage. The second piping body portion 54c is an elongate generally planar member which has a width dimension larger than its thickness dimension, and a higher degree of rigidity in its width direction than in its thickness direction. The second piping body portion 54c is formed so as to extend upwards from the first piping body portion 54b, more specifically, such that the second piping body portion 54c is arcuately curved in a forward direction of the vehicle 10 while extending in the upward direction of the vehicle 10, as shown in FIG. 3. The second piping body portion 54c is provided at its upper end part 54a with the branch pipe 56 connected thereto. The second piping body portion 54c has a plurality of fixing portions 60 in the form of plates formed integrally therewith so as to extend outwardly from its outer surface. The fixing portions 60 have respective bolt holes, through which respective fixing bolts 58 extend to fix the second piping body portion 54c to a fixing structure (not shown) provided to fix the oil piping assembly 50. For example, the fixing structure is a wall of the casing 14.

The oil piping body 54 further includes the third piping body portion 54d in the form of a cylindrical member formed of a resin material. As shown in FIG. 3, the third piping body portion 54d is provided to connect the first and second piping body portions 54b and 54c to each other such that these piping body portions 54b and 54c communicate with each other at their respective upper and lower end parts 54f and 54g. For example, the third piping body portion 54d is the cylindrical member having a suitable length and extending in the width direction of the vehicle 10.

Figure 4:
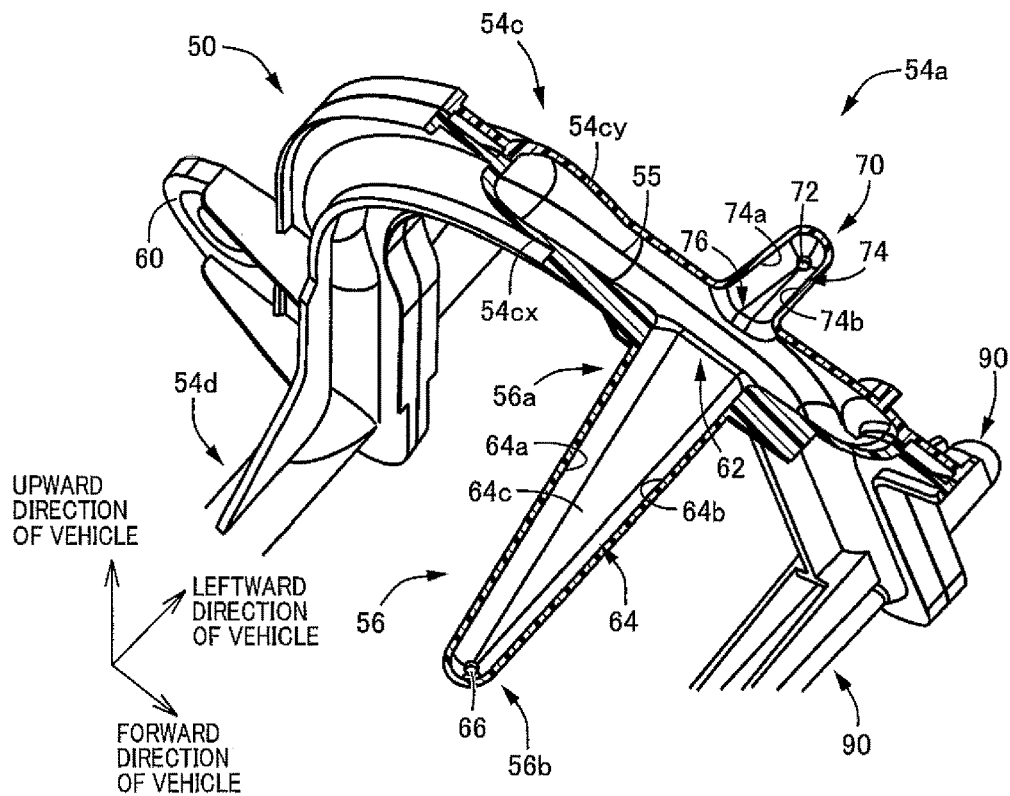
FIG. 4 is a perspective view showing an upper end portion of the oil piping assembly of FIG. 3, and portions of the oil piping assembly located adjacent to its upper end portion, partly in cross section in a substantially horizontal plane at the upper end portion of the oil piping assembly, at which an uppermost branch pipe is provided.
Figure 5:
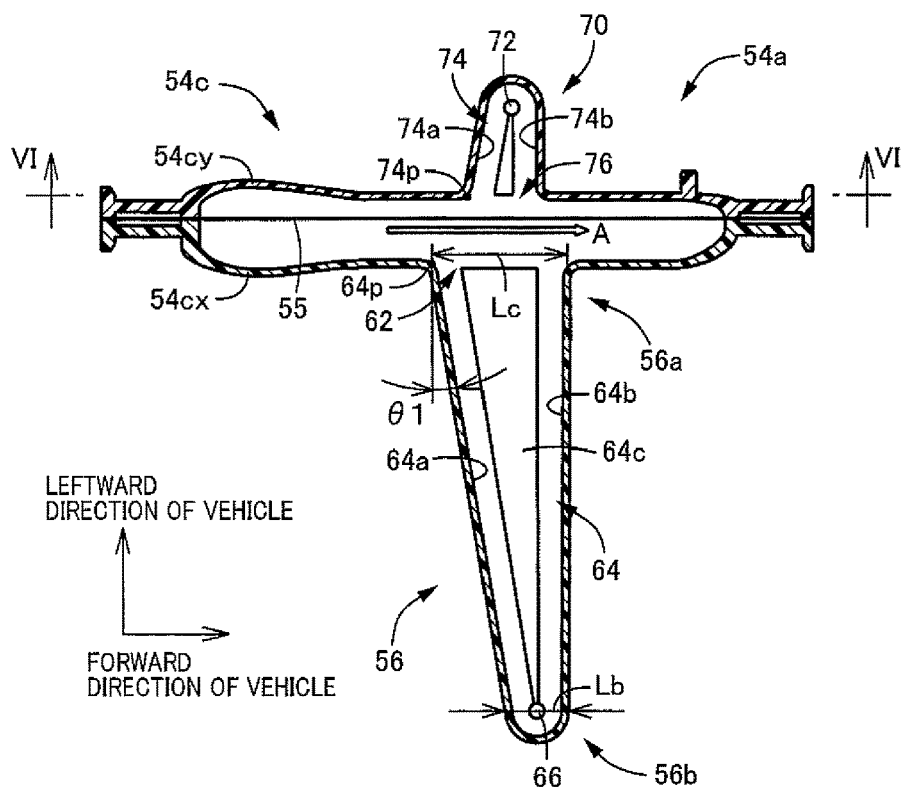
FIG. 5 is a cross sectional view of the upper end portion of FIG. 4, as seen in the downward direction.
Figure 6:
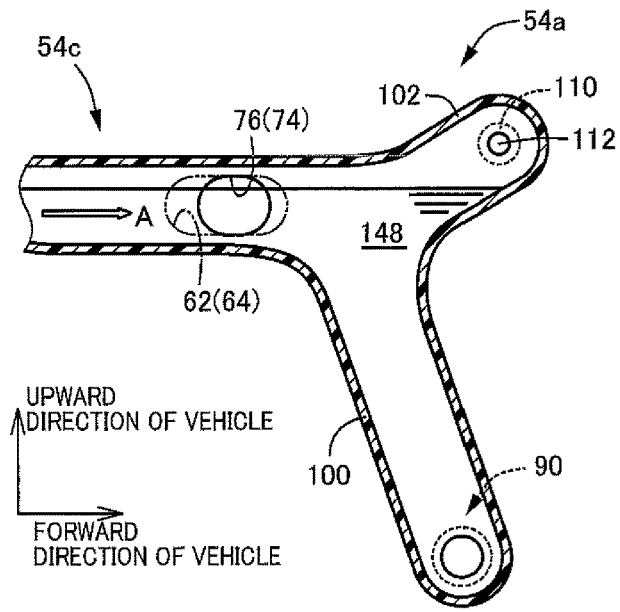
FIG. 6 is a cross sectional view taken along line VI-VI of FIG. 5, which corresponds to the cross sectional view of FIG. 5.

The branch pipe 56 is a generally elongate planar hollow member extending substantially horizontally and laterally from the upper end part 54a of the oil piping body 54 in the width direction of the vehicle 10. For instance, the branch pipe 56 is formed integrally with the second piping body portion 54c. FIG. 4 is the perspective view showing an upper end portion of the oil piping assembly 50, and portions of the oil piping assembly 50 located adjacent to its upper end portion, partly in cross section in a substantially horizontal plane at the upper end portion of the oil piping assembly 50 provided with the branch pipe 56. FIG. 5 is the cross sectional view of the upper end portion of FIG. 4 taken in a horizontal plane, as seen in the downward direction. FIG. 6 is the cross sectional view taken along line VI-VI of FIG. 5, namely, taken in a substantially vertical plane. As is apparent from these figures, and as described above, the second piping body portion 54c consists of the two resin sheets 54cx and 54cy which are bonded together at a bonding or parting plane 55 parallel to a longitudinal direction of the second piping body portion 54c. The two resin sheets 54cx and 54cy are located on respective opposite sides of the bonding plane 55 as seen in the width direction of the vehicle 10. The second piping body portion 54c (upper end part 54a of the oil piping body 54) has a generally horizontally extending upper section extending in the forward direction of the vehicle 10, and the branch pipe 56 is formed by injection molding, integrally with this upper section of the second piping body portion 54c, such that the branch pipe 56 extends laterally from the resin sheet 54cx in the width direction of the vehicle 10 (more specifically, in the rightward direction) in a substantially horizontal direction. It is noted that the branch pipe 56 formed integrally with the second piping body portion 54c may be replaced by a branch pipe which is formed separately from and fixed to the second piping body portion 54c. In this case, the branch pipe consists of two sheets which are formed of a resin material by injection molding and which have respective U-shaped grooves and are bonded together by high-frequency induction welding, for instance, such that the two sheets define a hollow branch pipe structure.

The branch pipe 56 includes a proximal end portion 56a formed so as to follow a configuration of the upper end part 54a of the oil piping body 54, that is, a configuration of the above-described horizontally extending upper section of the second piping body portion 54c. The branch pipe 56 is connected at its proximal end portion 56a to the second piping body portion 54c. In the present embodiment, the proximal end portion 56a has a width dimension La (indicated in FIG. 3) in the longitudinal direction of the vehicle 10, namely, in a longitudinal direction of the oil piping body 54. The branch pipe 56 has a distal end portion 56b remote from the second piping body portion 54c and opposite to the proximal end portion 56a in the width direction of the vehicle 10. The distal end portion 56b has a width dimension Lb (indicated in FIGS. 3 and 5) smaller than the width dimension La of the proximal end portion 56a. The branch pipe 56 is formed such that its width dimension continuously decreases as the branch pipe 56 extends in the width direction of the vehicle 10 from its proximal end portion 56a toward its distal end portion 56b, namely, decreases from the width dimension La to the width dimension Lb.

The proximal end portion 56a of the branch pipe 56 has an oval opening 62 having a length dimension in its width direction. The second piping body portion 54c has a main oil flow passage A formed therethrough, while the branch pipe 56 has a branch oil flow passage 64 which communicates with the main oil flow passage A through the opening 62. Like the width dimension La of the proximal end portion 56a, a dimension Lc of the opening 62 in the width direction of the branch pipe 56 is larger than the width dimension Lb of the distal end portion 56b. Namely, the width dimension La of the proximal end portion 56a is determined such that the width dimension Lc of the opening 62 communicating with the main oil flow passage A is larger than the width dimension Lb of the distal end portion 56b. As described above, the branch pipe 56 is connected at its proximal end portion 56a to the second piping body portion 54c so that the branch pipe 56 is held in communication with the oil piping body 54, whereby the oil 148 introduced into the oil piping body 54 with the operation of the first oil pump P1 is directed to the distal end portion 56b of the branch pipe 56 through the opening 62. The distal end portion 56b of the branch pipe 56 has a delivery nozzle 66 through which the oil 148 is delivered toward the selected lubricated portion or portions 162. The above-indicated width dimension Lb of the distal end portion 56b is its width dimension at a position of formation of the delivery nozzle 66. A cross sectional surface area of flow of the oil 148 through the above-described opening 62 is larger than a cross sectional surface area of flow of the oil 148 through a portion of the oil piping body 54 from which the branch pipe 56 branches, namely, larger than a cross sectional surface area of flow of the oil 148 through the second piping body portion 54c, so that a portion of the oil 148 flowing through the main oil flow passage A of the second piping body portion 54c is adequately introduced into the branch oil flow passage 64. It is noted that the cross sectional surface area of flow of the oil 148 of the oil piping body 54 is almost constant over its entire length.

The branch pipe 56 is located above the selected lubricated portion or portions 162, so that a portion of the oil 148 sucked up by the first oil pump P1 and introduced into the second piping body portion 54c is directed to the distal end portion 56b through the branch oil flow passage 64 of the branch pipe 56, and discharged from the delivery nozzle 66 downwards toward the selected lubricated portion or portions 162 located below the branch pipe 56. The oil 148 is sprayed downwards or dripped by gravity from the delivery nozzle 66 toward the lubricated portion or portions 162. The delivery nozzle 66 is open downwards.

The branch oil flow passage 64 formed through the branch pipe 56 is a tapered section having a width dimension which continuously decreases in a direction of extension of the branch pipe 56 from the proximal end portion 56a toward the distal end portion 56b, as seen in a plane of view of FIG. 5, namely, in a two-dimensional plane defined by an axis parallel to the width direction of the branch pipe 56 parallel to the direction of extension of the second piping body portion 54c (longitudinal direction of the vehicle 10), and an axis parallel to the direction of extension of the branch pipe 56 (width direction of the vehicle 10). In the present embodiment, the branch pipe 56 has two inner wall surfaces 64a and 64b which are opposite to each other in the width direction of the branch oil flow passage 64, and which extend linearly as seen in the plane of view of FIG. 5, so that the entirety of the branch oil flow passage 64 is formed as the tapered section the width dimension of which linearly decreases. That is, the entirety of the branch pipe 56 is formed as a tapered section. Each of the two inner wall surfaces 64a and 64b has an arcuate shape as seen in a vertical plane perpendicular to the above-indicated two-dimensional plane and the direction of extension of the branch pipe 56. These two inner wall surfaces 64a and 64b are connected at their upper and lower ends to each other through respective triangular upper and lower flat surfaces 64c (only the upper flat surface 64c shown in FIGS. 4 and 5). The branch pipe 56 is a generally planar hollow plate-like structure having a relatively small dimension between the upper and lower flat surfaces 64c in the vertical direction of the vehicle 10.

The branch pipe 56 has opposite side walls having the respective opposite two inner wall surfaces 64a and 64b described above. One of these opposite side walls which has the upstream inner wall surface 64a located on an upstream side of the main oil flow passage A through which the oil 148 flows through the oil piping body 54 is connected to the second piping body portion 54c such that the upstream inner wall surface 64a is inclined on a downstream side at an angle θ1 with respect to a direction perpendicular to the main oil flow passage A. This angle θ1 of inclination is selected within a range between about 5° and about 20°, for example. In the present embodiment, the angle θ1 is determined to be about 10°. On the other hand, the other side wall having the downstream inner wall surface 64b located on a downstream side of the main oil flow passage A is connected to the second piping body portion 54c such that the downstream inner wall surface 64b is inclined at an angle smaller than the angle θ1 of inclination of the upstream inner wall surface 64a, with respect to the direction perpendicular to the main oil flow passage A. In the present embodiment, the side wall having the downstream inner wall surface 64b is connected to the second piping body portion 54c such that the inner wall surface 64b is substantially perpendicular to the main oil flow passage A.

As described above, the branch pipe 56 in the present embodiment is configured such that the dimension Lc of the opening 62 in the width direction of the branch pipe 56 is larger than the width dimension Lb of the distal end portion 56b. Accordingly, an amount of the oil 148 flowing from the main oil flow passage A into the branch oil flow passage 64 of the branch pipe 56 is made larger, and an amount of the oil 148 flowing from the proximal end portion 56a toward the distal end portion 56b is made larger, than where the width dimension Lc of the opening 62 is equal to or smaller than the width dimension Lb of the distal end portion 56b, for example. In addition, the branch pipe 56 in the present embodiment is configured such that the width dimension Lb of the distal end portion 56b is smaller than the width dimension La of the proximal end portion 56a, so that the rigidity of the branch pipe 56 is made higher than where the width dimension Lb of the distal end portion 56b is equal to the width dimension La of the proximal end portion 56a, for example.

The oil piping assembly 50 further includes a branch pipe 70 extending laterally from the second piping body portion 54c in the width direction of the vehicle 10, to deliver the oil 148 to the lubricated portion or portions 162 not lubricated with the oil 148 through the branch pipe 56. The branch pipe 70 is formed integrally with the second piping body portion 54c such that the branch pipe 70 branches laterally from a longitudinal part of the second piping body portion 54c from which the branch pipe 56 branches, and such that the branch pipe 70 extends in the width direction of the vehicle 10 opposite to the direction of extension of the branch pipe 56. Described more specifically, the branch pipe 70 is formed integrally with the resin sheet 54cy of the second piping body portion 54c, such that the branch pipe 70 extends substantially horizontally in the leftward direction of the vehicle 10, while the branch pipe 56 extends in the rightward direction of the vehicle 10. The branch pipe 70 has a delivery nozzle 72 formed in its distal end portion, to deliver the oil 148 downwards. This branch pipe 70 is also a hollow structure having a branch oil flow passage 74 for communication of the delivery nozzle 72 with the main oil flow passage A of the second piping body portion 54c. As in the branch pipe 56, the branch pipe 70 has a proximal end portion having a width dimension larger than that of its distal end portion, and the branch oil flow passage 74 is held in communication with the second piping body portion 54c through an oval opening 76, and is formed as a tapered section as seen in the plane of view of FIG. 5. Namely, a side wall of the branch pipe 70 which has an upstream inner wall surface 74a located on an upstream side of the main oil flow passage A is connected to the second piping body portion 54c such that the upstream inner wall surface 74a is inclined on a downstream side with respect to a direction perpendicular to the main oil flow passage A. An angle of inclination of the upstream inner wall surface 74a is almost equal to the inclination angle θ1 of the upstream inner wall surface 64a of the branch pipe 56 described above. On the other hand, the other side wall having a downstream inner wall surface 74b located on a downstream side of the main oil flow passage A is connected to the second piping body portion 54c such that the downstream inner wall surface 74b is inclined at an angle smaller than the angle of inclination of the upstream inner wall surface 74a, with respect to the direction perpendicular to the main oil flow passage A. In the present embodiment, the side wall corresponding to the downstream inner wall surface 74b is connected to the second piping body portion 54c such that the inner wall surface 74b is substantially perpendicular to the main oil flow passage A.

The delivery nozzle 72 of the branch pipe 70 has the same diameter or size as the delivery nozzle 66 of the branch pipe 56, but has a smaller distance from the second piping body portion 54c than the delivery nozzle 66 of the branch pipe 56, namely, about ¼ of the distance of the delivery nozzle 66 from the second piping body portion 54c. Since the distance of the delivery nozzle 72 from the second piping body portion 54c is comparatively small, the width dimension of the proximal end portion of the branch pipe 70, that is, the width dimension of the opening 76 is determined to be smaller than the width dimension Lc of the opening 62 of the branch pipe 56. Further, an upstream-side branching point 74p of the branch oil flow passage 74 of the branch pipe 70 with respect to the main oil flow passage A is located downstream of an upstream-side branching point 64p of the branch oil flow passage 64 of the branch pipe 56 with respect to the main oil flow passage A. In the present embodiment, the branch pipes 56 and 70 are formed integrally with the second piping body portion 54c such that an entirety of the proximal end portion of the branch pipe 70 connected to the second piping body portion 54c is located within the width dimension La of the proximal end portion 56a of the branch pipe 56 in the longitudinal direction of the second piping body portion 54c. It is noted that the branch pipe 56 is a first branch pipe of the present invention, and the delivery nozzle 66 is a first delivery nozzle of the present invention while the branch oil flow passage 64 is a first branch oil flow passage of the present invention, and that the branch pipe 70 is a second branch pipe of the present invention, and the delivery nozzle 72 is a second delivery nozzle of the present invention while the branch oil flow passage 74 is a second branch oil flow passage of the present invention.

The oil piping assembly 50 further includes a plurality of branch pipes 90 (one of which is shown in FIG. 3) located below the branch pipes 56 and 70, to deliver the oil 148 to the lubricated portion or portions 162 not lubricated with the oil 148 delivered through the branch pipes 56 and 70. The branch pipes 90 are formed integrally with the second piping body portion 54c such that the branch pipes 90 are spaced apart from each other with respect to the direction of extension of the main oil flow passage A and laterally extend from the second piping body portion 54c substantially horizontally in the width direction of the vehicle 10. In the present embodiment, each of the branch pipes 90 has substantially the same width dimension at its proximal and distal end portions, that is, is formed as a cylinder having a substantially constant diameter over its entire axial length. However, like the branch pipe 56, each branch pipe 90 may be formed such that a width dimension of its proximal end portion is larger than that of its distal end portion. Each branch pipe 90 has a delivery nozzle 92 formed at its distal end portion such that the delivery nozzle 92 is open downwards to deliver the oil 148 toward the selected one or ones of the lubricated portions 162. The delivery nozzle 92 has substantially the same size as the delivery nozzles 66 and 72 of the branch pipes 56 and 70. It is noted that the branch pipe 90 is a third branch pipe of the present invention, and the delivery nozzle 92 is a third delivery nozzle of the present invention.

A downstream end part of the second piping body portion 54c which is located downstream of the branch pipes 56 and 70 in the direction of the main oil flow passage A has a downwardly inclined portion 100 and a upwardly inclined portion 102, as shown in FIG. 6. The plurality of branch pipes 90 include a pair of branch pipes 90 (one of which is shown in FIG. 6) which extend from a distal end part of the downwardly inclined portion 100 in the opposite width directions of the vehicle 10, namely, respective leftward and rightward directions of the vehicle 10. The upwardly inclined portion 102 has a distal end part located above the branch pipes 56 and 70. This distal end part has a communicating portion 110 through which an air breather hole 112 is formed for air communication between an interior space in the oil piping body 54 and the outside atmosphere, so that the air is exhausted from the oil piping assembly 50 into the outside atmosphere as the oil 148 is delivered from the first oil pump P1 and introduced into the oil piping assembly 50. Namely, even when the branch oil flow passages 64 and 74 of the branch pipes 56 and 70 located above the branch pipes 90 are filled with the oil 148, with their delivery nozzles 66 and 72 being prevented by the oil 148 from being exposed to the outside atmosphere, the air existing within the oil piping assembly 50 can be adequately discharged into the outside atmosphere through the air breather hole 112, so that the oil 148 can be smoothly delivered from the delivery nozzles 66, 72 and 92 of the branch pipes 56, 70 and 90.

The air breather hole 112 also has a function to discharge an excess of the oil 148 into the outside atmosphere when an excessive amount of the oil 148 is introduced from the first oil pump P1 into the oil piping assembly 50 during running of the vehicle 10 at a high running speed. That is, the operating speed of the first oil pump P1 increases with an increase of rotating speed of the drive wheels 38, so that a rate of delivery of the oil 148 from the first oil pump P1 is increased with a rise of the running speed V of the vehicle 10. Where an excessively large amount of the oil 148 is delivered to the lubricated portions 162 such as the gears, bearings and differential gear device 32 of the power transmitting system 12, the power transmitting system 12 suffers from a large power transmitting loss due to a resistance of the oil 148 to rotary motions of the lubricated portions 162 and an agitating resistance of the oil 148. To reduce this power transmitting loss, the excess of the oil 148 is discharged through the air breather hole 112 into the outside atmosphere. The oil 148 discharged through the air breather hole 112 is temporarily accommodated in a catcher tank 114 (shown in FIG. 2), gradually discharged through a drain hole 114a formed through a bottom wall of the catcher tank 114, and returned directly or through the lubricated portions 162 to the oil reservoir 146. The catcher tank 114 is formed separately from the casing 14, and fixed to the casing 14. The catcher tank 114 functions as an oil receiver.

In the power transmitting system 12 of the vehicle 10 according to the present embodiment described above, the oil piping assembly 50 includes the oil piping body 54 which has the oil inlet 52 through which the oil 148 is introduced therein and which is fixed so as to extend from the oil inlet 52 upwards of the vehicle 10. The oil piping assembly 50 further includes the branch pipe 56 which branches laterally from the upper end part 54a of the oil piping body 54 and which is held in communication with the oil piping body 54. The branch pipe 56 includes the proximal end portion 56a and the distal end portion 56b. The proximal end portion 56a is connected to the oil piping body 54 such that the direction of width of the proximal end portion 56a is parallel to the oil piping body 54, and the distal end portion 56b has the delivery nozzle 66 from which the oil 148 is delivered toward the selected one or ones of the lubricated portions 162. The branch pipe 56 has the opening 62 formed in the proximal end portion 56a, for communication of the branch pipe 56 with the oil piping body 54. The opening 62 has the dimension Lc in the direction of width of the branch pipe 56, which dimension Lc is larger than the dimension Lb of the distal end portion 56b in the direction of width of the branch pipe 56. In the present vehicular power transmitting system 12 wherein the width dimension La of the proximal end portion 56a of the branch pipe 56 and the width dimension Lc of the opening 62 of the proximal end portion 56a are larger than the width dimension Lb of the distal end portion 56b, an amount of the oil 148 flowing toward the distal end portion 56b of the branch pipe 56 is made larger even at a relatively low running speed of the vehicle 10, for example, than where the width dimension Lc of the opening 62 of the proximal end portion 56a is equal to or smaller than the width dimension Lb of the distal end portion 56b. The branch pipe 56 is further configured such that the width dimension Lc of the opening 62 at the proximal end portion 56a, which is determined to permit a flow of a sufficient amount of the oil 148 to the distal end portion 56b, is larger than the width dimension Lb of the distal end portion 56b, in other words, the width dimension Lb of the distal end portion 56b is smaller than the width dimension La of the proximal end portion 56a. Accordingly, the rigidity of the branch pipe 56 is made higher than where the width dimension Lb of the distal end portion 56b is equal to the width dimension La of the proximal end portion 56a, for instance, so that a risk of deformation of the branch pipe 56 due to a moment upon application of an external vibration load to the branch pipe 56 is reduced. The branch pipe 56, the natural frequency of which is increased owing to an increase of its rigidity, has a reduced risk of deformation due to a moment caused by an external vibrational load applied due to an operation of the engine 20 provided as the drive power source, for instance. Thus, the width dimension Lc of the opening 62 at the proximal end portion 56a of the branch pipe 56, which is larger than the width dimension Lb of the distal end portion 56b, makes it possible to ensure a sufficient amount of flow of the oil 148 to the distal end portion 56b of the branch pipe 56, while permitting reduction of a risk of deterioration of durability of the branch pipe 56.

The present vehicular power transmitting system 12 is further configured such that the opening 62 provided for communication of the branch pipe 56 with the oil piping body 54 has the cross sectional surface area of flow of the oil 148 therethrough, which is larger than the cross sectional surface area of flow of the oil 148 through the oil piping body 54, so that the oil 148 flowing through the oil piping body 54 can be smoothly introduced into the branch pipe 56, wherein the amount of flow of the oil 148 toward the distal end portion 56b of the branch pipe 56 can be effectively increased even while the oil piping assembly 50 is not filled with the oil 148, with a relatively low rate of flow of the oil 148 through the oil piping assembly 50.

The vehicular power transmitting system 12 is also configured such that the opposite two inner wall surfaces 64a and 64b define the branch oil flow passage 64 formed through the branch pipe 56, and such that one of the two side walls which has the upstream inner wall surface 64a located on the upstream side of the main oil flow passage A is connected to the oil piping body 54 such that the upstream inner wall surface 64a is inclined on the downstream side at the inclination angle θ1 with respect to the direction perpendicular to the main oil flow passage A. Accordingly, the oil 148 flowing through the oil piping body 54 is smoothly introduced into the branch pipe 56, so that an amount of flow of the oil 148 toward the distal end portion 56b of the branch pipe 56 can be effectively increased even when the oil piping assembly 50 is not filled with the oil 148, with a relatively low rate of flow of the oil 148 through the oil piping assembly 50.

The vehicular power transmitting system 12 is further configured such that the other of the opposite two side walls which has the downstream inner wall surface 64b located on the downstream side of the main oil flow passage A is connected to the oil piping body 54 such that the downstream inner wall surface 64b is inclined at the angle smaller than the angle θ1 of inclination of the upstream inner wall surface 64a, with respect to the direction perpendicular to the main oil flow passage A, namely, such that the downstream inner wall surface 64b is almost perpendicular to the main oil flow passage A. Accordingly, the oil 148 introduced into the branch oil flow passage 64 is prevented from flowing back into the oil piping body 54 along the downstream inner wall surface 64b, so that the amount of flow of the oil 148 toward the distal end portion 56b of the branch pipe 56 can be further increased. Namely, the angle of inclination of the downstream inner wall surface 64b smaller than the angle θ1 of inclination of the upstream inner wall surface 64a has an effect of preventing the flow of the oil 148 back into the oil piping body 54.

The vehicular power transmitting system 12 is also configured such that the oil piping assembly 50 further includes the second branch pipe 70 which branches laterally from the longitudinal part of the oil piping body 54 from which the first branch pipe 56 branches in a direction opposite to the direction in which the first branch pipe 56 extends. The second delivery nozzle 72 of the second branch pipe 70 has the smaller distance from the oil piping body 54, than the first delivery nozzle 66 of the first branch pipe 56. The first upstream-side branching point 64p of the first branch oil flow passage 64 formed through the first branch pipe 56 is located upstream of the second upstream-side branching point 74p of the second branch oil flow passage 74. Namely, the first branch pipe 56 having a comparatively large distance between the oil piping body 54 and its first delivery nozzle 66 than the second branch pipe 70 having a comparatively small distance between the oil piping body 54 and its second delivery nozzle 72 branches from the oil piping body 54 at the first upstream-side branching point 64p located upstream of the second upstream-side branching point 74p of the second branch pipe 70, so that the oil 148 is preferentially introduced into the first branch pipe 56 which has the comparatively large distance from the oil piping body 54 to its first delivery nozzle 66 and accordingly has a higher resistance to the flow of the oil 148 through its first branch oil flow passage 64. Accordingly, irrespective of the different oil flow resistances due to the different distances from the oil piping body 54 to the first and second delivery nozzles 66 and 72 of the first and second branch pipes 56 and 70, the delivery pressures of the oil 148 delivered from the first and second delivery nozzles 66 and 72 are made substantially equal to each other and thus amounts of delivered oil at respective delivery nozzles are equalized even when the oil piping assembly 50 is not filled with the oil 148, that is, a rate of flow of the oil 148 through the oil piping assembly 50 is relatively low.

Since the width dimension of the opening 76 of the branch oil flow passage 74 of the second branch pipe 70 is smaller than the width dimension Lc of the opening 62 of the branch oil flow passage 64 of the first branch pipe 56, a risk of disturbance of a smooth flow of the oil 148 into the first branch pipe 56 is reduced owing to the comparatively large width dimension Lc of the opening 62.

The vehicular power transmitting system 12 is further configured such that the oil piping assembly 50 further includes the third branch pipes 90 which branch laterally from the oil piping body 54 such that the third branch pipes 90 are located below the first and second branch pipes 56 and 70. The oil piping body 54 has the air breather hole 112 located above the first branch pipe 56. Accordingly, air is exhausted from the oil piping body 54 into the outside atmosphere through the air breather hole 112, so that the oil 148 can be adequately introduced into the first, second and third branch pipes 56, 70 and 90 located below the air breather hole 112. In the absence of the air breather hole 112, only a part of the air within the oil piping body 54 may be exhausted into the outside atmosphere through the first, second and third branch pipes 56, 70 and 90, but the rest of the air stays in an uppermost portion of the oil piping body 54, and disturbs flows of the oil 148 into the first and second branch pipes 56 and 70, causing a difference of amounts of flow of the oil 148 into the first and second branch pipes 56 and 70 with respect to that of the oil 148 into the third branch pipe 90.

The vehicular power transmitting system 12 is also configured such that the branch oil flow passage 64 formed through the branch pipe 56 is the tapered section the width dimension of which continuously decreases in the direction of extension of the branch pipe 56 from the proximal end portion 56a toward the distal end portion 56b, as seen in the plane of view of FIG. 5, that is, in the two-dimensional plane defined by the axis parallel to the direction of width of the branch pipe 56 and the axis parallel to the direction of extension of the branch pipe 56. Accordingly, the oil 148 introduced from the oil piping body 54 into the branch pipe 56 smoothly flows through the tapered section toward the distal end portion 56b, so that the amount of delivery of the oil 148 from the distal end portion 56b of the branch pipe 56 to the selected one or ones of the lubricated portions 162 can be effectively increased.

Other embodiments of this invention will be described. It is to be understood that the same reference signs used in the preceding first embodiment will be used to identify the substantially corresponding elements in the following embodiments, which will not be described redundantly.

Figure 7:
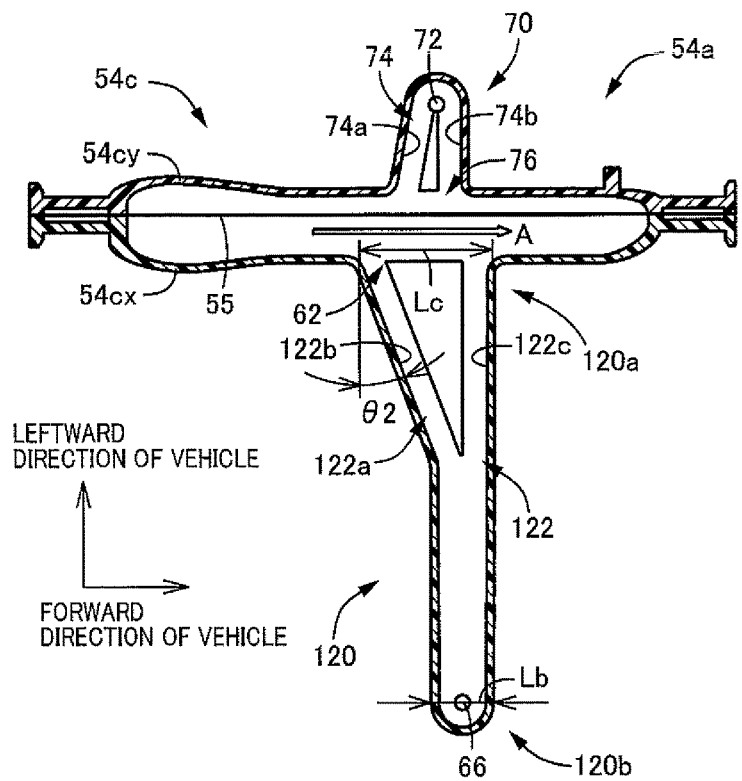
FIG. 7 is a cross sectional view of an oil piping assembly of a lubricating device of a vehicular power transmitting system according to another embodiment of this invention, which view corresponds to the cross sectional view of FIG. 5.

FIG. 7 is the cross sectional view corresponding to that of FIG. 5, showing a branch pipe 120 configured according to a second embodiment of this invention. The branch pipe 120 in this embodiment has a different shape from that in the previous embodiment. This branch pipe 120 provided as a first branch pipe has a proximal end portion 120a and a distal end portion 120b, and is formed integrally with the second piping body portion 54c such that the branch pipe 120 has a branch oil flow passage 122 communicating with the second piping body portion 54c through the opening 62 formed at the proximal end portion 120a. As in the first embodiment, the width dimension Lc of the opening 62 is larger than the width dimension Lb of the distal end portion 120b. The branch oil flow passage 122 includes a tapered section 122a which is located on the side of the proximal end portion 120a and which has a width dimension continuously decreasing in the direction from the proximal end portion 120a toward the distal end portion 120b, as seen in the plane of view of FIG. 7. A part of the branch oil flow passage 122, which is other than the tapered section 122a, is a rectangular section having a substantially constant width dimension. The branch pipe 120 has opposite side walls having respective upstream and downstream inner wall surfaces 122b and 122c which define the tapered section 122a. One of the side walls which has the upstream inner wall surface 122b is connected to the second piping body portion 54c such that the upstream inner wall surface 122b is inclined on a downstream side at an angle θ2 with respect to a direction perpendicular to the main oil flow passage A. This angle θ2 of inclination is larger than the angle θ1 of inclination of the upstream inner wall surface 64a of the branch pipe 56 in the first embodiment. For example, the angle θ2 is about 20°. On the other hand, the other side wall having the downstream inner wall surface 122c is connected to the second piping body portion 54c such that the downstream inner wall surface 122c is inclined at an angle smaller than the angle θ2 of inclination of the upstream inner wall surface 122b, with respect to the direction almost perpendicular to the main oil flow passage A. In the present embodiment, the side wall having the downstream inner wall surface 122c is connected to the second piping body portion 54c such that the inner wall surface 122cb is substantially perpendicular to the main oil flow passage A. The present second embodiment wherein the branch pipe 120 has the tapered section 122a has substantially the same advantages as the first embodiment.

Figure 8:
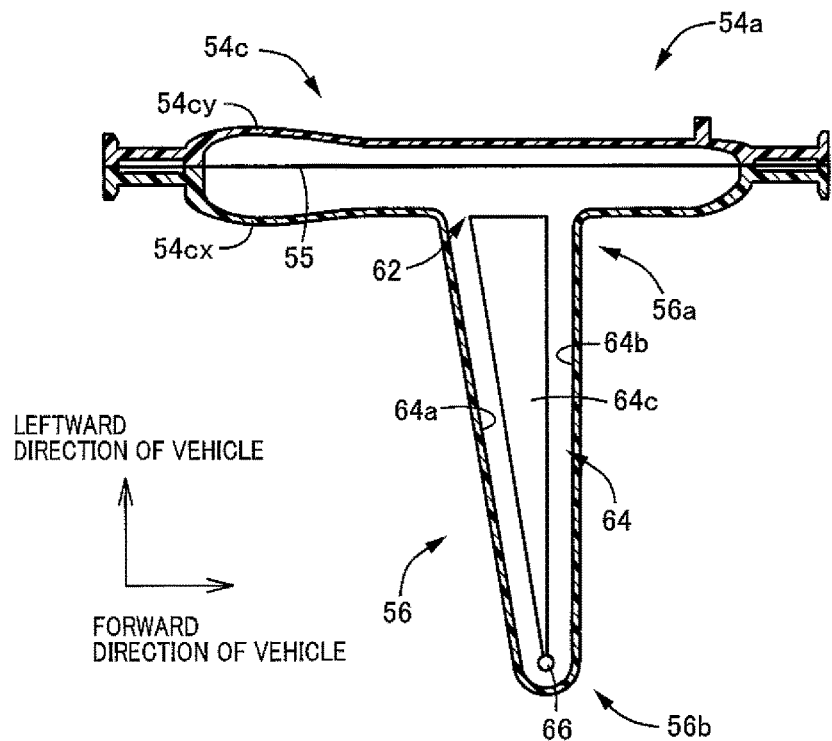
FIG. 8 is a cross sectional view of an oil piping assembly of a lubricating device of a vehicular power transmitting system according to a further embodiment of the invention, which view corresponds to the cross sectional view of FIG. 5.

FIG. 8 is the cross sectional view corresponding to that of FIG. 5, showing an oil piping assembly configured according to a third embodiment of the invention, which is not provided with the second branch pipe 70 extending in the direction opposite to the direction of extension of the first branch pipe 56. That is, the oil piping assembly of the power transmitting system according to the present invention need not be provided with the second branch pipe 70, and all of the plurality of third branch pipes 90 provided in the first embodiment. Namely, the second branch pipe 70 may be provided as needed, and at least one or all of the third branch pipes 90 may be eliminated.

Figure 9:
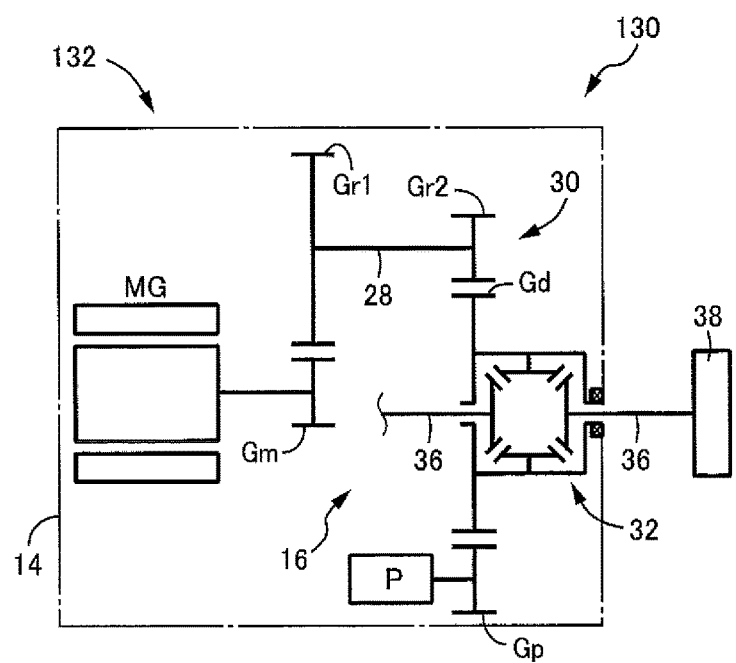
FIG. 9 is a schematic view showing an arrangement of a vehicular power transmitting system according to a still further embodiment of the invention.

FIG. 9 is the schematic view showing an arrangement of a vehicular power transmitting system 132 according to a fourth embodiment of the invention. A vehicle 130 provided with this power transmitting system 132 is an electric vehicle provided with a single motor/generator MG as a drive power source. The power transmitting system 132 is configured to transmit an output of the motor/generator MG to the left and right drive wheels 38 through the speed reducing gear device 30, differential gear device 32 and left and right drive shafts 36 in this order of description. Lubricated portions of the power transmitting system 132 are lubricated with the oil 148 which is sucked up by an oil pump P operated with a rotary motion of the differential ring gear Gd of the differential gear device 32, and which is delivered to the lubricated portions through the oil piping assembly 50 constructed as described above with respect to the first through third embodiments of the invention. Therefore, the same effect to the previous embodiments is obtained.

While the preferred embodiments of the invention have been described for illustrative purpose only, it is to be understood that the present invention may be embodied with various changes and improvements, which may occur to those skilled in the art.

In the illustrated first and third embodiments, the width dimension of the first branch pipe 56 continuously decreases in the direction from the proximal end portion 56a toward the distal end portion 56b. However, the width dimension of the branch pipe 56 may decrease in steps in the direction from the proximal end portion 56a toward the distal end portion 56b. Namely, the branch pipe 56 according to the present invention is required to be configured such that the width dimension Lc of the opening 62 is larger than the width dimension Lb of the distal end portion 56b, to ensure a sufficient amount of flow of the oil 148 to the distal end portion 56b of the branch pipe 56, while permitting reduction of a risk of deterioration of durability of the branch pipe 56.

In the illustrated first and third embodiments, the proximal end portion 56a of the branch pipe 56 is formed such that the width direction of the proximal end portion 56a is parallel to the longitudinal direction of the upper end part of the second piping body portion 54c and to the longitudinal direction (forward and backward direction) of the vehicle 10. However, the proximal end portion 56a may be formed depending upon the configuration of the upper end part of the second piping body portion 54c, such that the width direction of the proximal end portion 56a is parallel to the vertical direction (upward and downward direction) of the vehicle 10, or the width direction (leftward and rightward direction) of the vehicle 10.

It is to be further understood that the present invention may be embodied with various other changes and improvements not specifically described herein, which may occur to those skilled in the art.

NOMENCLATURE OF ELEMENTS

10, 130: vehicle
12, 132: power transmitting system
20: engine (drive power source)
38: drive wheels
50: oil piping assembly
52: oil inlet
54: oil piping body
  54a: upper end portion
56, 120: branch pipe (first branch pipe)
  56a, 120a: proximal end portion
  56b, 120b: distal end portion
62: opening
64: branch oil flow passage (tapered section) (first branch oil flow passage)
  64a, 122b: upstream inner wall surface
  64b, 122c: downstream inner wall surface
  64p: upstream-side branching point
66: delivery nozzle (first delivery nozzle)
70: branch pipe (second branch pipe)
72: delivery nozzle (second delivery nozzle)
74: branch oil passage (second branch oil passage)
  74p: upstream-side branching point
90: branch pipes (third branch pipe)
92: delivery nozzle (third delivery nozzle)
112: air breather hole
122: branch oil flow passage
  122a: tapered section
148: oil
162: lubricated portions
Gd: differential ring gear (power transmitting member)
MG: motor/generator (drive power source)
MG2: second motor/generator (drive power source)
P: oil pump
P1: first oil pump (oil pump)
Lb: width dimension of distal end portion
Lc: width dimension of opening
A: main oil flow passage

What is claimed is:

1. A power transmitting system of a vehicle including a drive power source and drive wheels, the power transmitting system comprising:

a power transmitting member through which a vehicle drive force is transmitted from the drive power source to the drive wheels;

an oil pump which is operated with a rotary motion of the power transmitting member; and an oil piping assembly through which an oil is delivered from the oil pump to a lubricated portion of the power transmitting system located higher in the vehicle than the oil pump, the oil piping assembly including:

an oil piping body which has an oil inlet through which the oil is introduced therein and which is fixed so as to extend upwardly from the oil inlet; and a first branch pipe which branches laterally from an upper end portion of the oil piping body and which is held in communication with the oil piping body, the first branch pipe including:

a proximal end portion connected to the oil piping body such that a width direction of the proximal end portion is parallel to the oil piping body;

a distal end portion having a delivery nozzle from which the oil is delivered toward the lubricated portion;

an opening formed in the proximal end portion, for communication of the first branch pipe with the oil piping body, the opening having a dimension in a width direction of the first branch pipe that is larger than a dimension of the distal end portion in the width direction of the first branch pipe; and opposite two side walls having respective opposite two inner wall surfaces which define a branch oil flow passage formed through the first branch pipe, for communication between the oil piping body and the delivery nozzle, the opposite two side walls including:
   one of the two side walls which has an upstream one of the two inner wall surfaces that is located on an upstream side of a main oil flow passage through which the oil flows through the oil piping body being connected to the oil piping body such that the upstream inner wall surface is inclined on a downstream side with respect to a direction perpendicular to the main oil flow passage; and
   the other of the opposite two side walls which has a downstream one of the two inner wall surfaces that is located on a downstream side of the main oil flow passage being connected to the oil piping body such that the downstream inner wall surface is inclined at an angle smaller than the angle of inclination of the upstream inner wall surface, with respect to the direction perpendicular to the main oil flow passage.

2. The power transmitting system according to claim 1, wherein the opening of the first branch pipe has a cross sectional surface area of flow of the oil therethrough, which is larger than a cross sectional surface area of flow of the oil through the oil piping body.

3. The power transmitting system according to claim 1, wherein the oil piping assembly further includes a second branch pipe which branches laterally from a longitudinal part of the oil piping body from which the first branch pipe branches, the second branch pipe extending in a direction opposite to a direction of extension of the first branch pipe from the oil piping body, and having a second delivery nozzle formed in a distal end portion of the second branch pipe,
   the second delivery nozzle of the second branch pipe having a smaller distance from the oil piping body, than the delivery nozzle of the first branch pipe provided as a first delivery nozzle,
   the first and second branch pipes having respective first and second branch oil flow passages which are formed therethrough, for communication between the oil piping body and the respective first and second delivery nozzles, and which have respective first and second upstream-side branching points with respect to the main oil flow passage, the first upstream-side branching point being located upstream of the second upstream-side branching point.

4. The power transmitting system according to claim 1, wherein the first branch pipe has a branch oil flow passage formed therethrough, for communication between the oil piping body and the delivery nozzle, and the branch oil flow passage includes a tapered section having a width dimension which continuously decreases in an extension direction of the first branch pipe from the proximal end portion toward the distal end portion, as seen in a two-dimensional plane defined by an axis parallel to the width direction of the first branch pipe and an axis parallel to the extension direction of the first branch pipe.

5. A power transmitting system of a vehicle including a drive power source and drive wheels, the power transmitting system comprising:
   a power transmitting member through which a vehicle drive force is transmitted from the drive power source to the drive wheels;
   an oil pump which is operated with a rotary motion of the power transmitting member; and
   an oil piping assembly through which an oil is delivered from the oil pump to a lubricated portion of the power transmitting system located higher in the vehicle than the oil pump, the oil piping assembly including:
      an oil piping body which has an oil inlet through which the oil is introduced therein and which is fixed so as to extend upwardly from the oil inlet;
      a first branch pipe which branches laterally from an upper end portion of the oil piping body and which is held in communication with the oil piping body, the first branch pipe including:
         a proximal end portion connected to the oil piping body such that a width direction of the proximal end portion is parallel to the oil piping body;
         a distal end portion having a delivery nozzle from which the oil is delivered toward the lubricated portion; and
         an opening formed in the proximal end portion, for communication of the first branch pipe with the oil piping body, the opening having a dimension in a width direction of the first branch pipe that is larger than a dimension of the distal end portion in the width direction of the first branch pipe;
      a second branch pipe; and
      a third branch pipe which branches laterally from the oil piping body such that the third branch pipe is located below the first branch pipe, the third branch pipe having a second delivery nozzle formed in a distal end portion of the third branch pipe, the oil piping body having an air breather hole for air communication between an interior space in the oil piping body and an outside atmosphere, the air breather hole being located above the part of the oil piping body from which the first branch pipe branches.

6. The power transmitting system according to claim 5, wherein the opening of the first branch pipe has a cross sectional surface area of flow of the oil therethrough, which is larger than a cross sectional surface area of flow of the oil through the oil piping body.

7. The power transmitting system according to claim 5, wherein the first branch pipe has opposite two side walls having respective opposite two inner wall surfaces which define a branch oil flow passage formed through the first branch pipe, for communication between the oil piping body and the delivery nozzle, and one of the two side walls which has an upstream one of the two inner wall surfaces that is located on an upstream side of a main oil flow passage through which the oil flows through the oil piping body is connected to the oil piping body such that the upstream inner wall surface is inclined on a downstream side with respect to a direction perpendicular to the main oil flow passage.

8. The power transmitting system according to claim 7, wherein the other of the opposite two side walls which has a downstream one of the two inner wall surfaces that is located on a downstream side of the main oil flow passage is connected to the oil piping body such that the downstream inner wall surface is inclined at an angle smaller than the angle of inclination of the upstream inner wall surface, with respect to the direction perpendicular to the main oil flow passage.

9. The power transmitting system according to claim 5, wherein the first branch pipe has a branch oil flow passage formed therethrough, for communication between the oil piping body and the delivery nozzle, and the branch oil flow passage includes a tapered section having a width dimension which continuously decreases in an extension direction of the first branch pipe from the proximal end portion toward the distal end portion, as seen in a two-dimensional plane defined by an axis parallel to the width direction of the first branch pipe and an axis parallel to the extension direction of the first branch pipe.

10. A power transmitting system of a vehicle including a drive power source and drive wheels, the power transmitting system comprising:

a power transmitting member through which a vehicle drive force is transmitted from the drive power source to the drive wheels;

an oil pump which is operated with a rotary motion of the power transmitting member; and an oil piping assembly through which an oil is delivered from the oil pump to a lubricated portion of the power transmitting system located higher in the vehicle than the oil pump, the oil piping assembly including:

an oil piping body which has an oil inlet through which the oil is introduced therein and which is fixed so as to extend upwardly from the oil inlet;

a first branch pipe which branches laterally from an upper end portion of the oil piping body and which is held in communication with the oil piping body, the first branch pipe including:

a proximal end portion connected to the oil piping body such that a width direction of the proximal end portion is parallel to the oil piping body;

a distal end portion having a delivery nozzle from which the oil is delivered toward the lubricated portion; and an opening formed in the proximal end portion, for communication of the first branch pipe with the oil piping body, the opening having a dimension in a width direction of the first branch pipe that is larger than a dimension of the distal end portion in the width direction of the first branch pipe;

a second branch pipe which branches laterally from a longitudinal part of the oil piping body from which the first branch pipe branches, the second branch pipe extending in a direction opposite to a direction of extension of the first branch pipe from the oil piping body, and having a second delivery nozzle formed in a distal end portion of the second branch pipe, the second delivery nozzle of the second branch pipe having a smaller distance from the oil piping body, than the delivery nozzle of the first branch pipe provided as a first delivery nozzle, the first and second branch pipes having respective first and second branch oil flow passages which are formed therethrough, for communication between the oil piping body and the respective first and second delivery nozzles, and which have respective first and second upstream-side branching points with respect to the main oil flow passage, the first upstream-side branching point being located upstream of the second upstream-side branching point; and a third branch pipe which branches laterally from the oil piping body such that the third branch pipe is located below the first branch pipe, the third branch pipe having a third delivery nozzle formed in a distal end portion of the third branch pipe, the oil piping body having an air breather hole for air communication between an interior space in the oil piping body and an outside atmosphere, the air breather hole being located above the part of the oil piping body from which the first branch pipe branches.

11. The power transmitting system according to claim 10, wherein the opening of the first branch pipe has a cross sectional surface area of flow of the oil therethrough, which is larger than a cross sectional surface area of flow of the oil through the oil piping body.

12. The power transmitting system according to claim 10, wherein the first branch pipe has a branch oil flow passage formed therethrough, for communication between the oil piping body and the delivery nozzle, and the branch oil flow passage includes a tapered section having a width dimension which continuously decreases in an extension direction of the first branch pipe from the proximal end portion toward the distal end portion, as seen in a two-dimensional plane defined by an axis parallel to the width direction of the first branch pipe and an axis parallel to the extension direction of the first branch pipe.

* * * * *